United States Patent
Hanna

(10) Patent No.: US 9,049,821 B1
(45) Date of Patent: Jun. 9, 2015

(54) WATER FLOW CONTROL SYSTEM

(71) Applicant: John Nashed Hanna, Austin, TX (US)

(72) Inventor: John Nashed Hanna, Austin, TX (US)

( * ) Notice: Subject to any disclaimer, the term of this patent is extended or adjusted under 35 U.S.C. 154(b) by 0 days.

(21) Appl. No.: 14/500,734

(22) Filed: Sep. 29, 2014

Related U.S. Application Data

(60) Provisional application No. 61/925,995, filed on Jan. 10, 2014.

(51) Int. Cl.
*A01G 25/16* (2006.01)
*G01W 1/10* (2006.01)
*G01F 1/00* (2006.01)
*G05D 7/06* (2006.01)

(52) U.S. Cl.
CPC ............ *A01G 25/16* (2013.01); *G01W 1/10* (2013.01); *G01F 1/00* (2013.01); *G05D 7/0635* (2013.01)

(58) Field of Classification Search
CPC .......... G05B 19/02; G05B 2219/2625; G05B 2219/25187; G05B 19/042; A01G 25/16; G05D 7/0635; G01W 1/10; G01F 1/00
USPC .................................................. 700/282–284
See application file for complete search history.

(56) References Cited

U.S. PATENT DOCUMENTS

| | | | | |
|---|---|---|---|---|
| 4,937,732 A * | 6/1990 | Brundisini | ...................... | 700/16 |
| 5,139,044 A * | 8/1992 | Otten et al. | ...................... | 137/80 |
| 6,337,635 B1 * | 1/2002 | Ericksen et al. | ........... | 340/12.28 |
| 6,453,215 B1 * | 9/2002 | Lavoie | .......................... | 700/284 |
| 7,756,917 B2 * | 7/2010 | DeHart et al. | ................ | 709/200 |
| 7,789,321 B2 * | 9/2010 | Hitt | ................................... | 239/63 |
| 8,465,262 B2 * | 6/2013 | Stiles et al. | ................... | 417/44.1 |
| 8,739,815 B2 * | 6/2014 | Harrington et al. | ......... | 137/355.2 |
| 2003/0034284 A1 * | 2/2003 | Wolfe | ............................. | 210/85 |
| 2003/0093159 A1 * | 5/2003 | Sieminski | ....................... | 700/12 |
| 2004/0039489 A1 * | 2/2004 | Moore et al. | .................. | 700/284 |
| 2005/0167625 A1 * | 8/2005 | Deen | ........................ | 251/129.04 |
| 2006/0054214 A1 * | 3/2006 | Caamano et al. | ............. | 137/78.3 |
| 2007/0106426 A1 * | 5/2007 | Ensworth et al. | ............ | 700/284 |
| 2008/0223951 A1 * | 9/2008 | Tracey et al. | .................. | 239/71 |
| 2009/0099701 A1 * | 4/2009 | Li et al. | ......................... | 700/284 |
| 2009/0216345 A1 * | 8/2009 | Christfort | ....................... | 700/21 |
| 2010/0012744 A1 * | 1/2010 | Kates | .............................. | 239/11 |
| 2011/0190947 A1 * | 8/2011 | Savelle et al. | ................. | 700/284 |
| 2012/0215366 A1 * | 8/2012 | Redmond et al. | ............. | 700/284 |
| 2013/0131874 A1 * | 5/2013 | Shupe et al. | .................. | 700/284 |
| 2013/0173070 A1 * | 7/2013 | Tennyson et al. | ............ | 700/284 |
| 2014/0129039 A1 * | 5/2014 | Olive-Chahinian et al. | .. | 700/284 |

* cited by examiner

*Primary Examiner* — Ramesh Patel
(74) *Attorney, Agent, or Firm* — Jackson Walker L.L.P.

(57) ABSTRACT

A watering control system includes a bridge device and a flow control device. The bridge device communicates with a web server to maintain a watering schedule. The bridge device also communicates wirelessly with the flow control device. The flow control device includes an annular inlet for connecting to an external faucet or another source of fluid, an annular outlet for connecting to a hose or another water conveying channel, and a conduit positioned in communication with the inlet and the outlet. The flow control device further includes a wireless receiver and a valve. The receiver is configured to receive a wirelessly transmitted valve activation signal from the bridge device and the valve is configured to open in accordance with the activation signal to enable the fluid to flow through the conduit.

19 Claims, 4 Drawing Sheets

WATER FLOW CONTROL SYSTEM

CROSS REFERENCE TO RELATED APPLICATION

A contemporaneously filed Application Data Sheet includes a priority claim, under 35 USC §119(e), to U.S. Application No. 61/925,995, entitled, IRRIGATION CONTROL SYSTEM, filed Jan. 10, 2014, the entirety of which is incorporated by reference herein.

BACKGROUND

1. Field of the Disclosure

Disclosed subject matter is in the field of home automation and, more specifically, devices for controlling the flow of water for irrigation or other purposes.

2. Description of the Related Art

Automated irrigation systems, whether targeted for residential or commercial use, have generally employed a controller box that receives a mains power supply and is hardwire connected to a network of low voltage AC solenoids through a set of low voltage AC switches located on a programmable control board. The programmable control board enables users to define a schedule for activating the AC switches and thereby activating the solenoids and controlling the flow of water to a lawn, garden, pool, fountain or other suitable destination. In the absence of such an irrigation system, the watering of plants and lawns and the control of water flow has been largely performed either manually or through the use of sprinklers and similar devices to which valves controlled by mechanical flow control devices have been attached.

DESCRIPTION OF EMBODIMENTS

Figure 1:
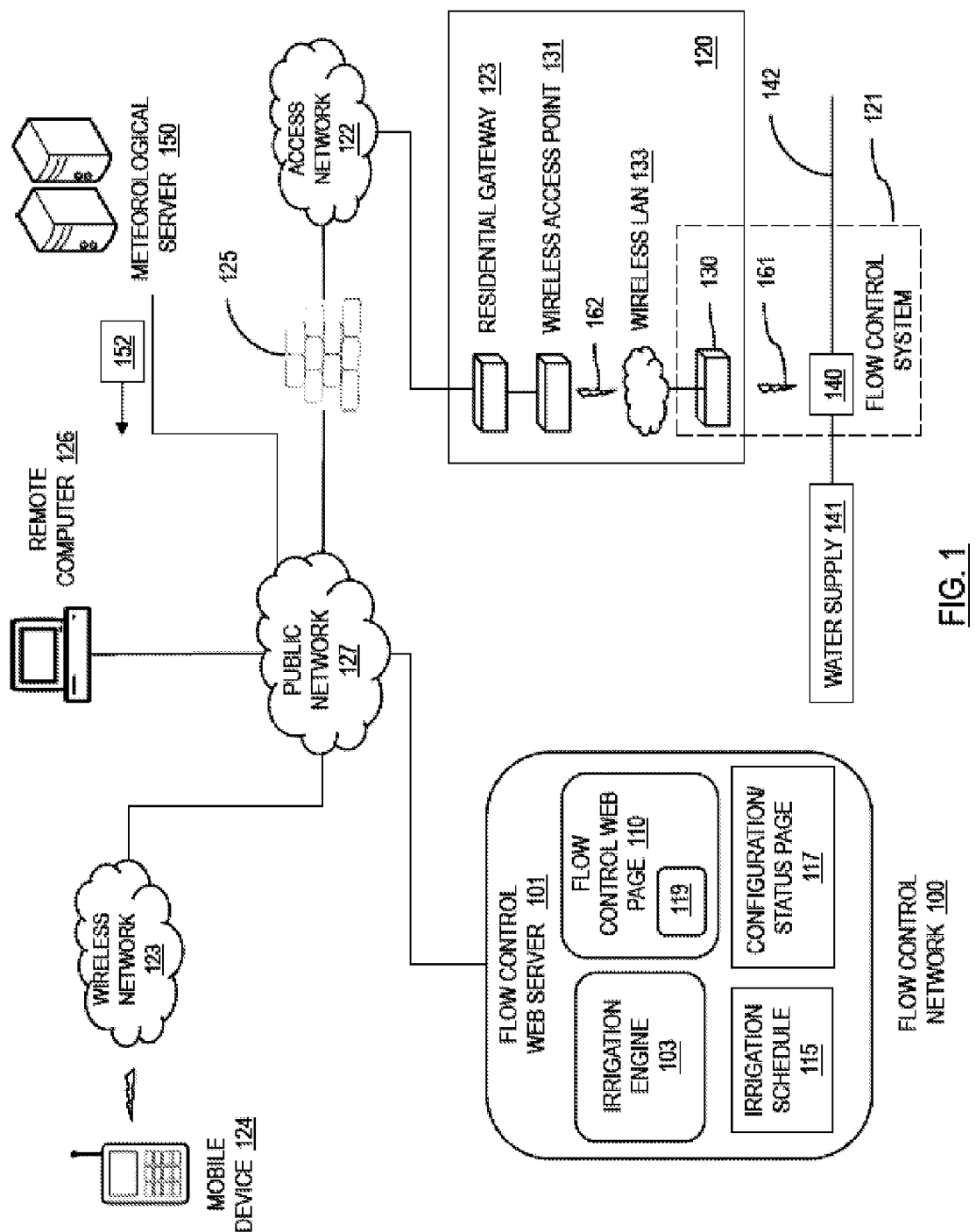
FIG. 1 illustrates elements of a flow control system including a bridge device and one or more flow control devices.

In at least one embodiment, an irrigation flow control device includes a conduit, a wireless receiver, and a valve. The wireless receiver is configured to receive wirelessly transmitted signals. In at least one embodiment, the flow control device is configured to open the valve in accordance with the receipt of a wirelessly transmitted valve activation signal to enable water to flow through the conduit. The valve may be any suitable type of valve including, without limitation, a solenoid valve.

The conduit may be in communication with an inlet configured to connect to an end of a first channel for conveying water. An internal end of an outlet may be in communication with the conduit and the outlet may include an external end configured to connect to an end of a second channel for conveying water. The first water conveying channel may be a pipe of flexible or rigid copper, PVC, or other suitable material connected to an external water faucet. In other cases, the flow control device may be connected between two hoses, with the hose delivering water to the flow control device serving as the first water conveying channel. In some embodiments, the inlet comprises an internally threaded cylinder. A diameter of the cylinder may be approximately 1.1313 (1 and ¹⁄₁₆) inches.

In at least one embodiment, the flow control device includes a fluid meter configured to indicate a value of a flow rate parameter, a volume parameter, or another suitable water parameter. The flow rate parameter may indicate a flow rate of water flowing through the conduit while the volume parameter may indicate a volume of water flowing through the conduit during an active interval of the valve. The flow rate device may include a shut off module configured to close the valve in accordance with the water parameter. In cases where the water parameter includes the volume parameter, the shut off module may be configured to close the valve in response to detecting the volume reaching a specific threshold.

In at least some embodiments, the wirelessly transmitted signal includes a carrier signal and the carrier frequency may be less than 1 GHz and may lie within an Industrial, Scientific and Medical (ISM) frequency band. Relative to at least some local wireless technologies and protocols, the use of a carrier frequency below 1 GHz may beneficially increase the range of the receiver.

The flow control device may still further include a power source configured to provide power to the receiver and the valve and a power switch configured to control a connection between the power source and one or more of the device's components. In at least one embodiment, the flow control device may include one or more light emitting diodes configured to indicate a state of the valve, the wireless receiver, or both. The flow control device may include a power switch configured to switch the source of power to the device components. The power source may be a photovoltaic cell, one or more batteries, another suitable power source, or a combination thereof.

The flow control device may include a schedule module to perform scheduling operations including, without limitation, receiving a schedule message indicative of a time for a scheduled activation of the valve, maintaining a schedule indicative of the scheduled activation, and activating the valve in accordance with scheduled activations indicated in the schedule. The scheduling operations may also include, without limitation, obtaining current time information and detecting a match between the current time information and the scheduled activation. The current time information may be indicative of a current time of day, a current day of week, or a current date including a current month and a current day of month. The schedule module may be implemented in one or more hardware devices, one or more software programs, or a combination of both. In at least one embodiment, the schedule module is implemented with a processor, which may be an embedded controller, a general purpose processor, an application specific integrated circuit, or another suitable integrated circuit. A computer readable memory device, accessible to the processor, may include program instructions, executable by the processor. The program instructions, when executed by the processor, may cause the processor, the flow control device, or a combination thereof to perform the scheduling operations.

Some embodiments are directed to water control methods and, in these embodiments, the method may include detecting, by a receiver of a flow control device connected to a supply of water, a wirelessly transmitted activation message sent from a bridge device. Responsive to receiving the activation message, some embodiments may activate, by the flow control device, a valve configured to control a flow of the water through a conduit defined by the flow control device. Some embodiments of the water control methods include detecting, by the receiver, a wirelessly transmitted activation message from a user device and activating the valve responsive to receiving the activation message from the user device. In some embodiments, the bridge device and the user device are both associated with a user. The user device may be in the form of a mobile phone associated with the user or a tablet device.

Still other embodiments are directed to a watering system that includes, in at least some embodiments, a bridge device and a flow control device. The bridge device may be configured to access an irrigation schedule and wirelessly transmit an activation message in accordance with the irrigation schedule. The bridge device may wirelessly transmit the activation message in compliance with any of a variety of wireless protocols. The flow control device may be configured to connect to an external water faucet. The flow control device, as discussed above, may include a wireless receiver configured to detect the activation message and a valve configured to open, in response to the activation message, to permit the flow of water from the water faucet. The bridge device may be further configured to communicate with a web server to maintain the irrigation schedule. In at least one embodiment, maintaining the irrigation schedule includes modifying the irrigation schedule responsive to receiving a meteorological message indicative of either a current meteorological condition or a forecasted condition.

A flow control device disclosed herein may include a chassis with an inlet configured to connect to a source of water or other liquid, a conduit portion defining a conduit in communication with the inlet, and an outlet in communication with the conduit. The flow control device may further include a wireless receiver configured to receive a wirelessly transmitted valve activation signal and a valve configured to open in accordance with the activation signal to enable the fluid to flow through the conduit. The flow control device may include a controller, control board, or the like and an optional real time clock providing time of day information, a processor, and a memory device including executable instructions that, when executed, cause the processor to perform operations including creating or modifying an irrigation schedule responsive to receiving a schedule message, detecting a match between the current time of day, and the scheduled activation, and activating, in response to detecting the match, the valve.

In some embodiments, sometimes referred to herein as integrated embodiments, the controller is contained within the chassis, along with the valve and the wireless transceiver. In other embodiments, sometimes referred to herein as distributed embodiments, the elements of the flow control device are provided as two or more distinct devices. In one distributed embodiment, the controller may be provided in a different housing or chassis than the valve.

The valve may be configured to control fluid flow through the conduit. The valve may be a solenoid valve activated by an electrical signal. In other embodiments, the valve may be a ball valve, a power screw, or another type of valve suitable for controlling the flow of fluid through the conduit.

In embodiments that include a controller, the controller is configured to draw power from a power source, which may be a battery, a solar power source such as a photovoltaic cell, an axial turbine in the flow path and a corresponding coil of wire, or the like. The controller may be coupled to or otherwise in communication with the wireless transceiver and the valve. The controller may include an embedded or general purpose processor and a flash memory or other type of computer readable storage device that includes processor-executable program instructions stored therein. Execution of the program instructions by the processor cause the flow control device to perform operations, which may include activating the solenoid valve responsive to receiving a wirelessly transmitted activation message.

The controller may include a real time clock providing information indicative of a current time of day and the operations may include creating or modifying an irrigation schedule in response to receiving a schedule message. The irrigation schedule may be indicative of a scheduled activation of the solenoid valve and the operations may include detecting a match between the current time of day indicated by the real time clock and the scheduled activation indicated by the irrigation schedule and activating the solenoid valve in response to detecting the match. The operations performed by the device may further include modifying the irrigation schedule responsive to receiving a meteorological message indicative of a current or a future or forecasted meteorological condition or parameter.

The irrigation schedule may be a time-based irrigation schedule that indicates a scheduled deactivation of a solenoid valve for each scheduled activation of the solenoid valve. In these embodiments, the operations performed by the device may include detecting a match between the current time of day and a scheduled deactivation time indicated by the irrigation schedule and deactivating, in response to detecting the match, the solenoid valve.

In some embodiments, the device may include a fluid meter configured to measure a flow rate of water flowing through the conduit. In these embodiments, the irrigation schedule may indicate a volume of fluid, rather than, or in addition to a scheduled deactivation time, associated with a scheduled activation. In these embodiments, the operations may include determining, based on the monitored flow rate, a volume of fluid flowing through the conduit after activation of the solenoid valve and deactivating the solenoid valve when the determined volume of fluid equals the volume of fluid indicated by the irrigation schedule.

Some embodiments, sometimes referred to herein as upstream embodiments, may create and maintain all or most of the irrigation schedule "upstream" of the flow control device, e.g., on the bridge device, the web server, a combination of the bridge device and the web server, or elsewhere. In these embodiments, the flow control device may only need to be able to receive and respond to valve activation and valve deactivation messages generated by upstream devices that create, maintain, and modify the irrigation schedule. In these upstream embodiments, the flow control device may be implemented without a distinct processor and, instead, the flow control device may employ circuitry to activate and deactivate the valve in response to activation and deactivation signals received by the wireless transceiver. As an example, an embodiment may be configured to activate the valve whenever the transceiver detects a properly formatted wireless signal. Similarly, the flow control device may include one or more high pass, low pass, band pass, and digital filters to recognize two or more distinct message types.

For embodiments in which the fluid control device valve is not a solenoid type valve activated and deactivated by electrical signals, the fluid control device may include one or more actuators to control an electrical signal from the transceiver to a mechanical, magnetic, acoustic, or other type of signal.

The wirelessly transmitted messages may be transmitted via a signal having a carrier frequency below 1 GHz. In some embodiments, wirelessly transmitted messages may be transmitted via a signal having a carrier frequency within any of a number of industrial, scientific, and medical (ISM) frequency bands. The device may support Zigbee-compliant communication and, in these embodiments, the device may communicate wirelessly with a Zigbee-compliant signal having a 915 MHz carrier frequency. In other embodiments, the flow control device may support and employ other standards including, as non-limiting examples, Wi-Fi and Bluetooth communication standards.

The flow control device chassis may include or define an opening for an LED configured to indicate a status of the solenoid valve. The flow control device may further include an operational button or other selectable control element accessible to a user and configured to operate a switch connecting the power source to the controller. Embodiments of the flow control device suitable for use with standard residential watering faucets may include an externally threaded or male inlet having a diameter suitable for connecting to a standard 1 1/16" diameter hose connector, as well as an internally threaded or female outlet having a diameter suitable for receiving a standard 1 1/16" water faucet.

Additional subject matter disclosed herein includes a flow control method, which may be performed by the flow control device. The flow control method may include detecting a wirelessly transmitted activation message sent from a bridge device, and activating, by a flow control device connected to a supply of water, a solenoid or other type of valve configured to control a flow of the water through a conduit defined by the flow control device in responsive to receiving a wirelessly transmitted activation message sent from the bridge device. The operations may further include creating or modifying an irrigation schedule responsive to receiving a schedule message from the bridge device. The irrigation schedule may be indicative of a scheduled activation of the solenoid valve and the operations may include detecting a match between the current time of day indicated, for example, by a real time clock of the flow control device or the bridge device, and the scheduled activation. The operations may further include activating, in response to detecting the match, the solenoid valve.

The operations performed by the flow control device or a device upstream of the flow control device may include modifying the irrigation schedule responsive to receiving a meteorological message indicative of either a current or forecasted meteorological condition. In time-based irrigation embodiments, the irrigation schedule may indicate a scheduled deactivation of the valve and the method may include detecting a match between the current time of day and the scheduled deactivation, and deactivating, in response to detecting the match, the solenoid valve. In some embodiments, the flow control device includes a flow meter and the irrigation schedule may be indicative of a volume of water associated with the scheduled activation. In these embodiments, the flow control meter may monitor a volume of fluid flowing through the conduit after activation of the valve and, deactivate the valve when the volume of fluid equals or exceeds a specified volume, which may be indicated in the irrigation schedule or elsewhere.

Disclosed subject matter may still further include a memory device or other form of a tangible computer readable medium that includes program instructions executable by a processor. The program instructions, when executed by the processor of a flow control device, may cause the flow control device to perform various operations or methods including activating a solenoid or other type of valve responsive to receiving a wirelessly transmitted activation message. In these embodiments, activating the valve enables water to flow through a conduit defined by the flow control device. The operations may further include maintaining an irrigation schedule indicative of a scheduled activation of the solenoid valve, detecting a match between the current time of day and the scheduled activation, and activating, in response to detecting the match, the valve. In addition, the operations may still further include modifying the irrigation schedule responsive to receiving a meteorological message indicative of a past, present, or forecasted meteorological parameter or condition.

The flow control device may be suitable for locating at a water faucet outside a home or other premises, and may communicate with and/or act in concert with a bridge device. The bridge device and the flow control device may be configured to communicate wirelessly with each other in accordance with any of various suitable communication protocols using any suitable portion of the radio bandwidth spectrum. The bridge device may be located within a home or other premises of a user while the flow control device may be employed outdoors, connected to a supply of water or another fluid under pressure.

In at least one embodiment, an inlet of the flow control device is connected to an output of a water faucet located outside, but adjacent to or in proximity to the premises. The water faucet may be connected to a supply line connected to a supply of water under pressure including, as examples, a municipal water supply or a private well. The faucet may include a faucet valve and a handle to operate the faucet valve mechanically. When the faucet valve is open, water flows through the faucet to the inlet of the flow control device. In some embodiments, a conduit of the flow control device connects the flow control device inlet to a flow control device outlet.

In some embodiments, a solenoid valve of the flow control device may be configured to control the flow of fluid through the conduit. The solenoid valve may have two or more ports and may be normally open, normally closed, or bi-stable. In at least one embodiment, the solenoid valve is a bi-stable or latching internally-piloted solenoid valve. In these embodiments, the piloted solenoid may be configured to toggle between a closed position and an open position in response to a pulsed signal comprising a relatively abrupt and brief electrical signal. In these embodiments, the solenoid valve may consume little or no appreciable power except during the brief duration of the pulses.

In at least one embodiment, the flow control device and the bridge device communicate wirelessly. The flow control device and the bridge device may communicate via a 915 MHz signal or another suitable ISM-band frequency using any of a variety of modulation techniques including any of the Wi-Fi supported modulations, Bluetooth, Zigbee, or any other suitable proprietary or open source modulation. In some embodiments, the bridge device may use two different wireless communication techniques including, without limitation, 915 MHz communication between the bridge device and the flow control device and Wi-Fi communication to communicate with a web page or web server. The bridge device may be able to send data to and receive commands and other data from a publically accessible web page, sometimes referred to herein as an irrigation control web page or, more simply, a web page. The irrigation control web page may be accessible by smartphone, computer, or tablet. The web page may be able to query data that is publically available, including data from the National Oceanographic and Atmospheric Association (NOAA), and use this data to adjust an irrigation schedule.

In at least one embodiment, a flow control system including the bridge device and flow control device can be remotely controlled or otherwise accessed from any Internet-enabled device. A user interface to the system may be accessible using a conventional browser or a dedicated mobile device application. In some embodiments, usage history associated with the flow control system is recorded. In at least some embodiments, the flow control system receives weather data, which may be publically available or accessible through a subscription. The flow control system can maintain an irrigation schedule and adjust the schedule based at least in part on the weather data including, as a non-limiting example, by omitting a scheduled watering if adequate rainfall has occurred or is forecasted to occur or by increasing watering frequency during a period of unexpectedly low rain fall.

In at least one embodiment, an internally piloted solenoid valve is used to start/stop the flow of water. The solenoid may use magnets to allow it to rest in the open or closed position. In at least one embodiment, electrical current is required only when changing from one state to another. A 915 MHz receiver may be used to receive commands from the bridge device, potentially extending the range beyond the range of a Wi-Fi based communication.

In at least one embodiment, an axial turbine is installed in the conduit and the flow of water spins the turbine. Outside the conduit, the number of revolutions may be detected by a magnet or other mechanism and a flow rate may be calculated based on this information. Flow rate may be used instead of time to determine how long a watering session may last, thereby extending the watering period when the flow rate is lower and vice versa.

In at least one embodiment, two "AA" user-replaceable batteries may be used to power electronic components in the device. In some embodiments, the flow control device may include solar power generation elements such as a photovoltaic cell or a group of such cells to replace or supplement battery power. In some embodiments, the flow control device may include an axial turbine configured to provide replacement or supplemental power. In at least one embodiment, the flow control device includes a button on the device chassis that can be pressed to manually turn the flow of water on/off.

In at least one embodiment, the bridge device connects to a Wi-Fi network and may check a central website periodically for any changes to a pre-existing irrigation schedule. It may also check the central website for any modifications to the schedule based on weather data retrieved from the NOAA or elsewhere. Flash memory and/or other types of storage may store schedules for each flow control device (in some embodiments, up to 16 devices can be connected to a single bridge). Data may be stored on the bridge device or on the flow control device itself. On/Off commands and other communication may be transmitted wirelessly, e.g., using a 915 MHz carrier signal, to each flow control device. The bridge device may plug directly into a source of mains power, e.g., 120V or 240V AC and a suitable AC/DC converter may be integrated as part of the bridge device.

In at least one embodiment, creation and modification of irrigation schedules can be performed via a central website. The central website can be accessed by computer, smartphone device, or tablet. Applications may be written to customize the central website for access on a mobile device, whether smartphone or tablet. Individual flow control devices can be asynchronously toggled on/off via the central web site. Watering history (e.g., in gallons and minutes) may be recorded and viewable for each flow controller device. The central website may query data including meteorological data from NOAA or other sources, and automatically adjust irrigation schedules based on weather conditions.

In various embodiments, any one or more of the following factors may be employed to determine water requirements: local rainfall, humidity, temperature, solar radiation, wind, and the pan evaporation rate. In at least one embodiment, the central website may query, access, maintain, or otherwise obtain data for any one or more of these or other variables. When freezing temperatures are forecast, the central website may alert users to relocate flow control devices indoors to prevent damage. The central website may report the percentage of battery life remaining in each sprinkler timer.

Referring now to the drawings, FIG. 1 illustrates selected elements of one embodiment of a flow control network 100 that supports wireless and remote configuration and control of one or more flow control systems 121 located at an end user premises 120. The flow control network 100 illustrated in FIG. 1 includes a flow control web server 101 communicably accessible to end user premises 120 through an access network 122 and a public network 127. Public network 127 encompasses the Internet, including the World Wide Web and any other private or publicly accessible IP-based network. FIG. 1 illustrates a firewall 125 insulating access network 122 from public network 127. Access network 122 may be a private network accessible only to subscribers, including end user premises 120, of an Internet service provider. In other embodiments, access network 122 may be a publically accessible network and firewall 125 may be omitted.

In addition to communicating with end user premises 120, the flow control web server 101 illustrated in FIG. 1 communicates with a meteorological server 150 to obtain meteorological information 152. Flow control web server 101 may provide flow control web page 110 to support remote access to flow control system 121. Remote access may include access from a mobile device 124 via a wireless network 123 as well as access from a remote computer 126, which may be a laptop, desktop, or another suitable type of computer.

Flow control web page 110 may enable users to access supported resources and features of flow control network 100 and flow control systems 121 including features for accessing and controlling an irrigation schedule 115 of a flow control device 140. Flow control web page 110 may be accessible from an Internet browser of remote computer 126 or from an Internet browser or a dedicated application executed by mobile device 124. In some embodiments, flow control web page 110 may provide users with access to flow control features including, in addition to an irrigation schedule 115 for flow control system 121, flow control configuration/status page 117, and a meteorological interface 119.

As illustrated in FIG. 1, end user premises 120 includes a residential gateway 123 in communication with a wireless access point 131 that provides or manages a wireless local area network 133. Residential gateway 123 provides an interface between wireless local area network 133 and access network 122. Access network 122 represents a physical medium and network devices, generally provided by a service provider, enabling communication and access to public network 127.

The end user premises 120 illustrated in FIG. 1 includes a flow control system 121 comprising a bridge device 130, illustrated within the confines of end user premises 120, and a flow control device 140, illustrated outside of end user premises 120. Bridge device 130 may communicate wirelessly with flow control web server 101 via wireless access point 131, residential gateway 123, and public network 127.

In at least one embodiment, an end user accesses flow control web page 110 to access, retrieve, or initialize irrigation schedule 115 for one or more flow control devices 140 at the end user premises 120. After initializing irrigation schedule 115, flow control system 100 may operate automatically, with or without end user intervention, to monitor meteorological information 152 from meteorological server 150 and, in some embodiments, information provided from flow control device 140, to modify irrigation schedule 115 as needed according to watering criteria. Irrigation schedule 115 may, in some embodiments, be generated and maintained by an irrigation engine 103 accessible to or supported by flow control web page 110. In one embodiment, irrigation schedule 115 may be accessed or monitored by any or all of the flow control web page 110, bridge device 130, and flow control device 140. Although FIG. 1 illustrates irrigation schedule 115 being provided from web server 101 or computer storage accessible to web server 101, irrigation schedule 115 may be generated and/or modified or maintained further downstream, at bridge device 130 or storage accessible to bridge device 130, or at flow control device 140 or storage accessible to flow control device 140. Regardless of where irrigation schedule 115 is generated and/or maintained, irrigation schedule 115 may include scheduling information or other information indicative of criteria for activating flow control device 140 to deliver water from a water supply 141 to an intended destination, such as a garden or lawn (not depicted in FIG. 1), through a hose 142 or similar apparatus.

Irrigation schedule 115, in at least one embodiment, includes scheduling information such as the time of day, day of week, and date-month information when a valve of flow control device 140 should be activated as well as a time of day when the valve should be deactivated. In these embodiments, flow control device 140 is controlled according to or based upon time as the primary consideration. In other embodiments, flow control device 140 may include a flow meter suitable for determining a flow rate of water passing through flow control device 140 and, in these embodiments, irrigation schedule 115 may include or contain criteria for activating and deactivating a valve based upon a volume of water rather than an amount of time. To illustrate, irrigation schedule 115 may include information indicating that a valve in flow control device 140 is to be activated at 6:00 AM each Saturday morning. In some embodiments, irrigation schedule 115 may also indicate that flow control device 140 is to be deactivated 20 minutes after it is activated. In embodiments of flow control device 140 that employ a flow meter, however, irrigation schedule 115 may include information indicating that the deactivation of the valve is to occur after a specified volume of water has flowed through flow control device 140. If, for example, conditions are such that water flows from an open faucet at a rate of approximately 5 gallons/minute, a 20 minute watering would generally provide 100 gallons of water. Embodiments of flow control device 140 that include metering resources may use flow information to provide more accurate and consistent irrigation by indicating that for example, flow control device 140 should be activated at 6 AM on Saturday mornings and remain activated until 100 gallons of water have been delivered. In these embodiments, fluctuations in water pressure, and or flow rate, may not result in variations in the amount of water delivered.

Figure 2:
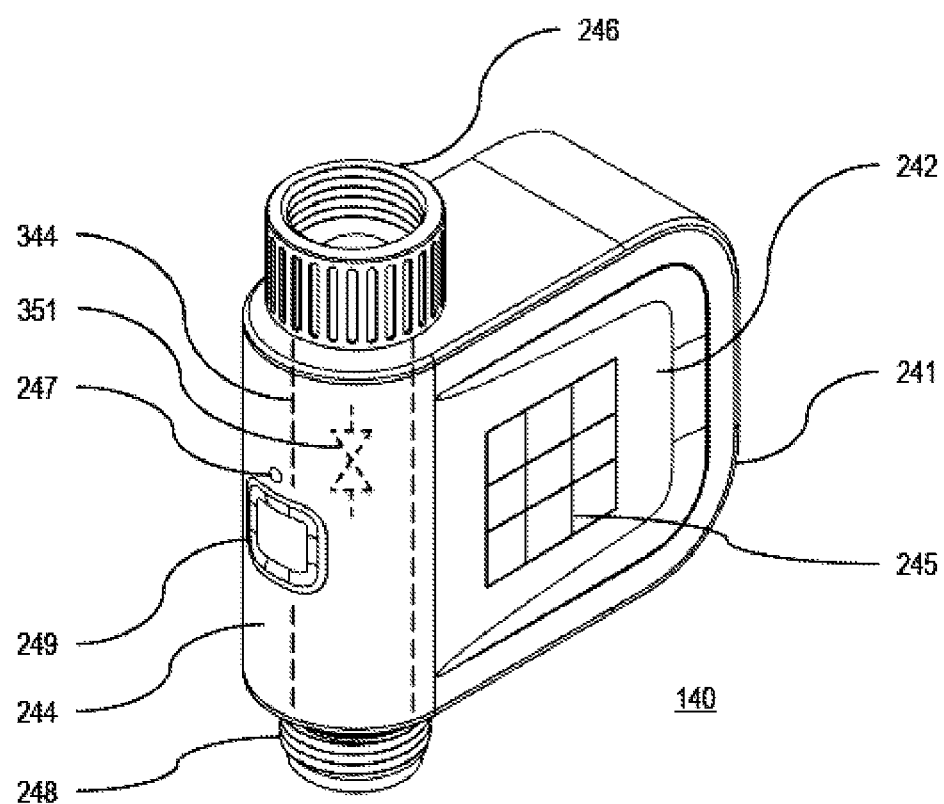
FIG. 2 is a perspective view of a flow control device for use in the flow control system of FIG. 1.
Figure 3:
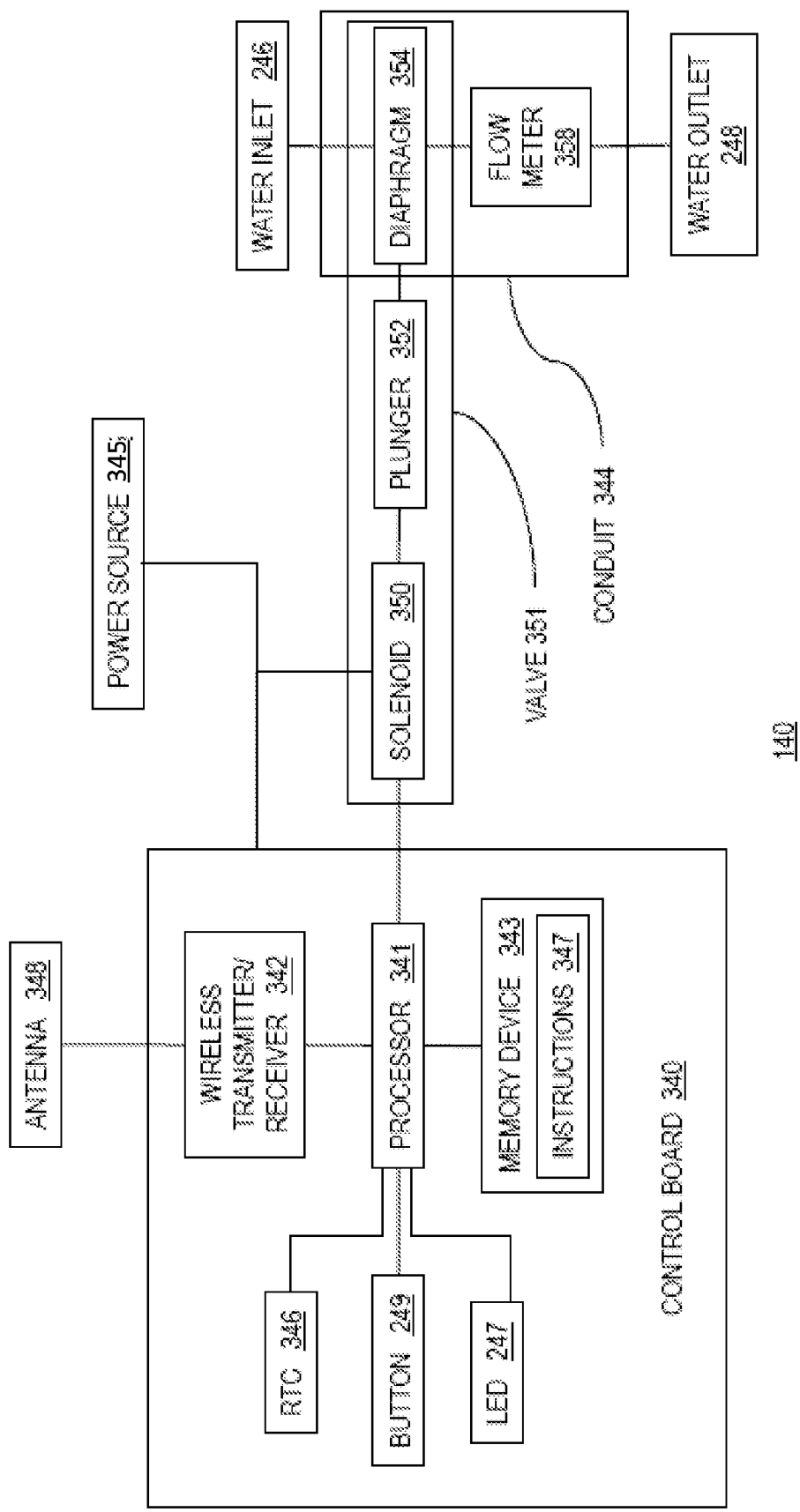
FIG. 3 illustrates a block diagram of an embodiment of a flow control device suitable for use in the flow control system of FIG. 1.

Referring now to FIG. 2 and FIG. 3, a flow control device 140 is illustrated in perspective in FIG. 2 and in block diagram form in FIG. 3. As illustrated in FIG. 2, flow control device 140 includes a chassis 241 including a substantially rectangular main body 242 extending from a conduit section 244. An inlet 246 and an outlet 248 are affixed at opposite ends of conduit section 244. The inlet 246 and outlet 248 illustrated in FIG. 2 are substantially circular annular columns of relatively short height. In one embodiment, inlet 246 and outlet 248 have an outer diameter in the range of approximately ½" to 1½ "and a height of approximately ½" to 1½ ". In one embodiment, the diameter of inlet 246 is equal or substantially equal to the 1 1/16" diameter of a standard faucet outlet. The inlet 246 may be internally threaded whereas outlet 248 may be externally threaded to enable inlet 246 to connect to a threaded faucet or other output while enabling a hose (not depicted in FIG. 2) to connect to outlet 248. Inlet 246 may be rotatable with respect to main body 242 so that main body 242 may be oriented as desired when inlet 246 is fully engaged on a faucet.

The flow control device 140 illustrated in FIG. 2 further includes a light emitting diode (LED) 247 and a selectable control element in the form of a button 249. In at least one embodiment, LED 247 may indicate when the valve is activated or when water or another fluid is flowing through flow control device 140 and button 249 may be used for manually activating and/or deactivating the valve. Flow control device 140 may further include one or more solar elements 245 on one or more of the surfaces of chassis 241 to provide a source of renewable power to any electrical devices and circuits included within chassis 241.

Although the flow control device 140 illustrated in FIG. 2 is shown with a minimum number of user interface elements, other embodiments may incorporate additional or different control elements, buttons, and so forth on chassis 241 to enable various additional features or access to additional features at the device itself. For example, embodiments of flow control device 140 that include the wireless transceiver resources may include buttons or other control elements to reset or activate and deactivate the wireless transceiver.

The flow control device 140 illustrated in FIG. 3 includes a control board 340, a solenoid valve 351, which includes a plunger 352 and a diaphragm 354, and a power source 345. The control board 340 illustrated in FIG. 3 includes a wireless transmitter/receiver (transceiver) 342, a processor 341, and a memory device 343. Memory device 343 may include volatile or nonvolatile storage elements, accessible to processor 341, for storing and accessing data and executable instructions 347. In at least one embodiment, memory device 343 includes a flash memory device and may include other types of memory devices. The control board 340 illustrated in FIG. 3 includes an optional real time clock 346, which may include a continuously-operated counter powered by a persistent source of power such as a battery-backed CMOS storage element. Real-time clock 346 provides a source of time-of-day and perhaps additional calendar information including day-of-week and month, date, and year information to processor 341. The wireless transmitter/receiver 342 illustrated in FIG. 3 is connected to an antenna 348. Wireless transmitter/receiver 342, in conjunction with antenna 348 may support bi-directional wireless communication via any number of standard or proprietary wireless interfaces and protocols including, as examples, IEEE 802.11 (Wi-Fi) wireless communication, Bluetooth wireless communication, Zigbee communication, and so forth.

In at least one embodiment, control board 340 includes processor executable program instructions 347 stored in memory device 343. Program instructions 347, upon execution by processor 341, cause flow control device 140 to operate, e.g., activate and deactivate, valve 351 in accordance with an irrigation schedule 115. In at least one embodiment, sometimes referred to herein as a downstream embodiment, irrigation schedule 115 may be stored within memory device 343 of flow control device 140 and, in this embodiment, memory device 343 may include program instructions enabling processer 341 to interpret irrigation schedule 115 and convert information stored in irrigation schedule 115 to activate and deactivate valve 351, as necessary, to implement the irrigation schedule. In other embodiments, referred to as upstream embodiments, irrigation schedule 115 may be stored further upstream, i.e., further from flow control device 140 and closer to flow control web server 101. For example, irrigation schedule 115 may be maintained on bridge device 130 and/or on flow control web page 110. In either of these embodiments, a device upstream of flow control device 140 may interpret irrigation schedule 115 and generate valve activation and deactivation commands or signals. In these upstream embodiments, communication with flow control device 140 may be primarily comprised of valve activation and deactivation commands sent from bridge device 130. In these embodiments, in which flow control device 140 may need only to receive and interpret a relatively small number of commands, control board 340 may omit or simplify real time clock 346, processor 341, and memory device 343, and transmitter/receiver 342 may be implemented as a receive only device.

The valve 351 illustrated in FIG. 3 is a solenoid valve that includes a solenoid 350, a plunger 352, and a diaphragm 354 as will be familiar to those of skill in the field of electromechanical actuators. Valve 351 is configured for opening and closing a conduit 344 to permit or prohibit the flow of water or other fluid from inlet 246 to outlet 248. In at least one embodiment, solenoid 350 is an internally piloted solenoid that requires only a relatively low and relatively brief activation current to activate solenoid 350 and thereby open conduit 344. In one embodiment, solenoid 350 may operate at an activation current of less than approximately 100 mA and may require an activation pulse width of less than approximately 10 ms. In some embodiments, the plunger 352 and diaphragm 354 are configured, in conjunction with water pressure provided at water inlet 246, to maintain valve 351 in a closed condition until an activation signal is received from processor 341, at which point, valve 351 transitions to an open state that is maintained until a subsequent deactivation signal is received. In these embodiments, valve 351 may consume substantially all of its energy during the brief transitions from open to close and vice versa while drawing substantially no or little power during steady state operation. The flow control device 140 illustrated in FIG. 3 includes an optional flow meter 358 configured to measure a flow rate of water flowing through conduit 344.

Figure 4:
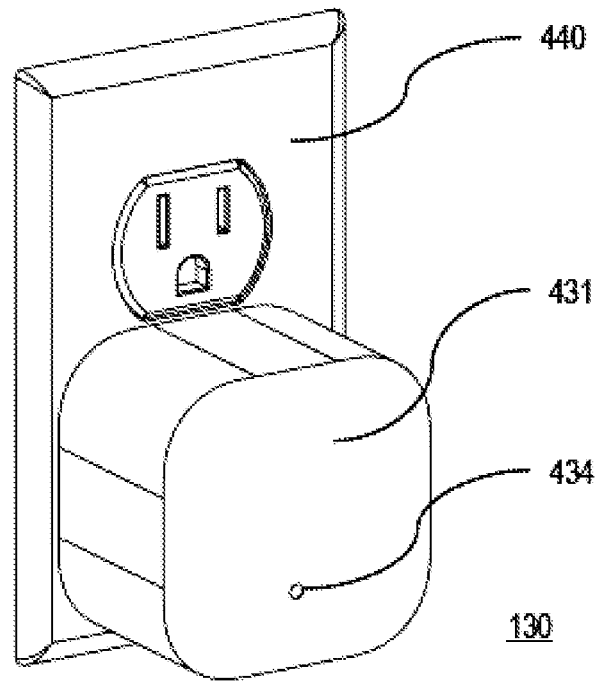
FIG. 4 is a perspective view of a bridge device suitable for use in the flow control system of FIG. 1.
Figure 5:
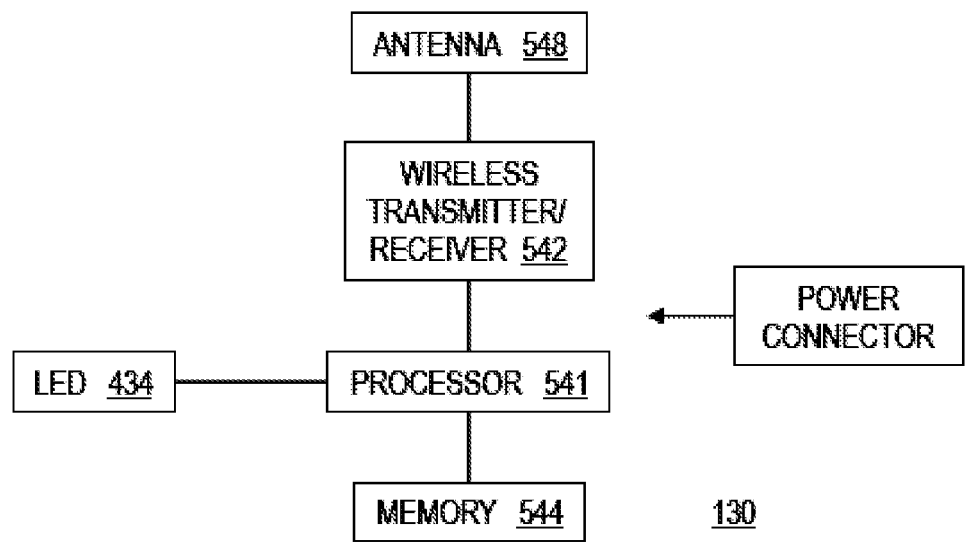
FIG. 5 is a block diagram of the bridge device of FIG. 4.

Referring now to FIG. 4 and FIG. 5, a bridge device 130 is shown in perspective in FIG. 4 and in block diagram form in FIG. 5. The bridge device 130 illustrated in FIG. 4 includes a chassis 431 configured to plug directly into a conventional wall socket 440. The bridge device 130 illustrated in FIG. 4 includes an LED 434 configured to illuminate when power is provided to bridge device 130. The LED 434 may illuminate and/or blink to indicate other conditions as well. For example, LED 434 may blink when information is being transmitted to or from bridge device 130.

The bridge device 130 illustrated in FIG. 5 includes a processor 541 coupled to a memory device 544 and to a wireless transmitter/receiver 542. Wireless transmitter/receiver 542 is shown coupled to an antenna 548 analogous to the manner in which analogous elements are illustrated with respect to flow control device 140 in FIG. 3. However, whereas flow control device 140 may communicate with bridge device 130 only, bridge device 130 must generally support communication with two or more devices including both the flow control device 140 and the web page server 101. More specifically, as depicted in FIG. 1, bridge 130 may be configured to communicate wirelessly with flow control device 140 via a first wireless protocol represented by reference number 161. Bridge device 130 is also shown communicating with wireless access point 131 via a communication protocol represented in FIG. 1 by reference number 162. In at least one embodiment, the first wireless protocol 161 and the second wireless protocol 162 represent different communication protocols. In at least one embodiment, second communication protocol 162 represents an IEEE 802.11 or Wi-Fi wireless communication while communication protocol 161 represents a 915 megahertz Zigbee signal having a carrier frequency within an ISM frequency band and an effective communication range that exceeds the range supported by Wi-Fi signal 162. In some embodiments, the irrigation schedule 115 may be maintained at bridge device 130 and, in these embodiments, the bridge device 130 may include program instructions stored in memory 544 that enable bridge device 130 to interpret the irrigation schedule 115 and communicate valve activation/deactivation commands to flow control device 140.

The scope of the following claims is not restricted or limited to the embodiments illustrated in the drawings and described in the foregoing description, but is the scope consistent with the broadest reasonable interpretation of the claim language, not taught or suggested by prior art, and equivalents thereof.

What is claimed is:

1. An irrigation flow control device, comprising:
   an inlet configured to connect to a water faucet;
   an outlet configured to connect to a water hose;
   a conduit configured to convey water from the inlet to the outlet;
   a wireless receiver configured to receive a wirelessly transmitted valve activation signal;
   a valve configured to open and close the conduit in accordance with the wirelessly transmitted valve activation signal; and
   a fluid meter configured to indicate a water parameter, wherein the water parameter is selected from;
   a flow rate parameter indicative of a flow rate of water flowing through the conduit; and
   a volume parameter indicative of a volume of water flowing through the conduit during an active interval of the valve.

2. The device of claim 1, wherein the valve comprises a solenoid valve including a solenoid configured to actuate a plunger coupled to a diaphragm within the conduit.

3. The device of claim 2, wherein the solenoid comprises a bi-stable solenoid configured to toggle the valve in response to a signal pulse, wherein the wirelessly transmitted valve activation signal comprises an activation pulse.

4. The device of claim 3, wherein a pulse width of the activation pulse does not exceed approximately 10 ms and an activation current does not exceed approximately 100 mA.

5. The device of claim 1, further comprising:
   a shut off module configured to close the valve in accordance with the water parameter.

6. The device of claim 5, wherein the water parameter includes the volume parameter and wherein the shut off module is configured to close the valve in response to detecting the volume reaching a specific threshold.

7. The device of claim 1, wherein the wirelessly transmitted valve activation signal is transmitted via a signal having a carrier frequency, wherein the carrier frequency is:
   less than 1 GHz; and
   within an industrial, scientific and medical (ISM) frequency band.

8. The device of claim 1, further comprising:
   a power source configured to provide power to a component selected from:

the wireless receiver; and
the valve; and
a power switch configured to control a connection between the power source and the component.

9. The device of claim 8, further comprising:
a light emitting diode configured to indicate a state of at least one of:
the valve; and
the power switch.

10. The device of claim 8, wherein the power source comprises a photovoltaic cell.

11. The device of claim 1, wherein the inlet comprises an internally threaded cylinder, and wherein a diameter of the cylinder is approximately 1.1313 (1 and 1/16) inches.

12. The device of claim 1, further comprising:
a schedule module configured to perform operations comprising:
receiving a schedule message indicative of a time for a scheduled activation of the valve;
maintaining a schedule indicative of the scheduled activation; and
activating the valve in accordance with scheduled activations indicated in the schedule.

13. The device of claim 12, wherein the operations include:
obtaining current time information indicative of at least one of:
a current time of day;
a current day of week; and
a current date including a current month and a current day of month; and
detecting a match between the current time information and the scheduled activation.

14. The device of claim 12, wherein the schedule module comprises:
a processor; and
a computer readable memory device, accessible to the processor, including program instructions executable by the processor to the operations.

15. A water control method, comprising:
detecting, by a wireless receiver of a flow control device configured to connect a conduit between a water faucet and a water hose, wirelessly transmitted valve activation signal and wirelessly transmitted valve deactivation signals from a bridge device configured to:
communicate with a wireless access point to establish a web connection;
obtain irrigation schedule information from a web server; and
wirelessly communicate the valve activation signals and the valve deactivation signals to the wireless receiver in accordance with the irrigation schedule information; and
opening and closing a valve of the flow control device, in accordance with the valve activation signals and the valve deactivation signals, to enable or prohibit water flow of the water the through the conduit.

16. The method of claim 15, further comprising:
detecting, by the wireless receiver, wirelessly transmitted activation messages and wirelessly transmitted deactivation messages from a user device; and
valve opening and closing the valve in accordance with the activation messages and deactivation messages;
wherein the user device is selected from:
a mobile phone; and
a tablet device.

17. A watering system, comprising:
a bridge device configured to:
access an irrigation schedule; and
wirelessly transmit an activation signal in accordance with the irrigation schedule; and
a flow control device configured to connect an external water faucet to a water hose via a conduit, the flow control device including:
a wireless receiver configured to detect the activation signal; and
a valve, within the conduit, configured to open, in response to the activation signal, to permit the flow of water from the water faucet.

18. The watering system of claim 17, wherein the bridge device is configured to:
communicate with a web server to maintain the irrigation schedule; and
wirelessly transmit the activation signal in accordance with a local area wireless protocol.

19. The watering system of claim 18, wherein maintaining the irrigation schedule includes:
modifying the irrigation schedule responsive to receiving a meteorological message indicative of at least one of:
a current meteorological condition; and
a forecasted meteorological condition.

* * * * *